June 15, 1926.
H. SCHÜMANN
1,588,470
DEVICE FOR DETERMINING THE HARMONIC RELATIONS OF MUSICAL NOTES
Filed March 11, 1924      2 Sheets-Sheet 1
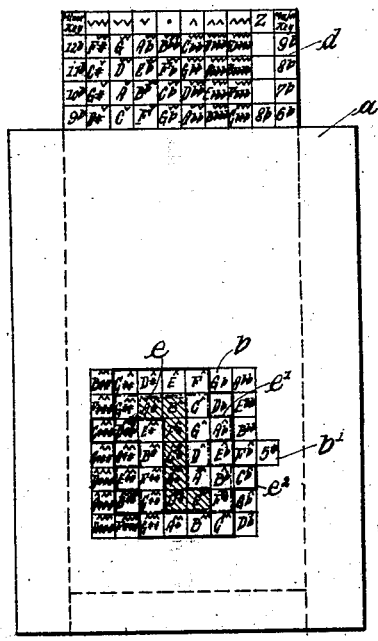
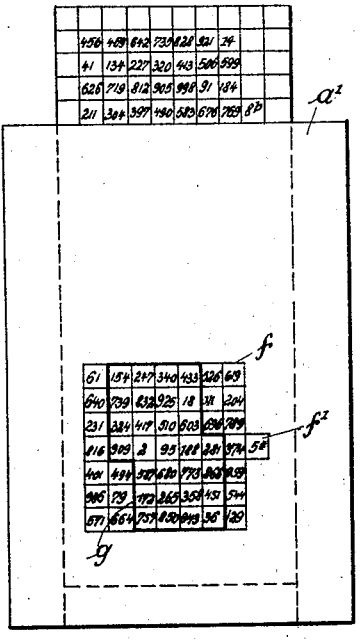
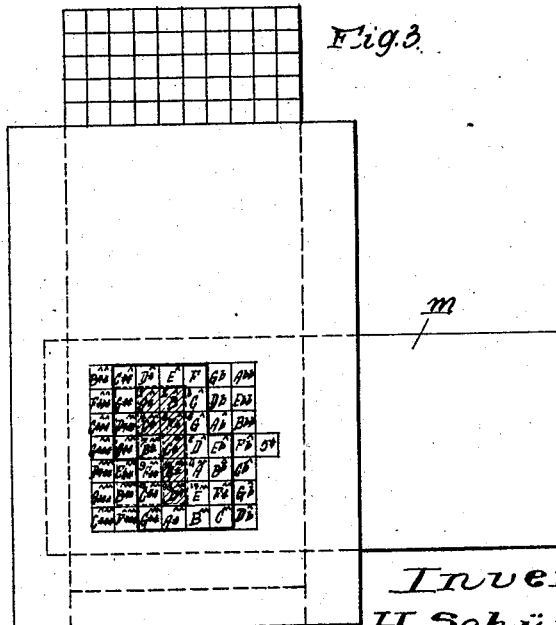
Inventor
H. Schümann
By Marks Clerk
Attys June 15, 1926.

H. SCHÜMANN 1,588,470

DEVICE FOR DETERMINING THE HARMONIC RELATIONS OF MUSICAL NOTES

Filed March 11, 1924  2 Sheets-Sheet 2

Inventor
H. Schümann
By Marks Clerk
Attys.

Patented June 15, 1926.

1,588,470

UNITED STATES PATENT OFFICE.

HANS SCHÜMANN, OF MUNICH, GERMANY.

DEVICE FOR DETERMINING THE HARMONIC RELATIONS OF MUSICAL NOTES.

Application filed March 11, 1924, Serial No. 698,522, and in Germany March 19, 1923.

The subject of this invention is a note-determining device or indicator, i. e. a device for teaching music and for use in musical practice, which is intended to be used for determining and testing the harmonic relations of musical notes in a purely mechanical way. Such indicators are usually made in the form of a slide rule consisting of two relatively slideable parts, by means of which marks on one part can be set to graduations on the other part. According to the present invention the observation aperture of a frame is provided with a system of lines for indicating groups of notes, by means of which notes indicated on the slide and brought into a definite relation through the position of the sliding member can be formed into musical groups. Preferably the numbers of vibrations of the notes on the front of the sliding member are marked on the back thereof and the back of the frame is provided with a similar observation aperture, the system of lines on which for indicating groups of notes forms these vibration numbers into groups and places them in the correct relation to one another. These observation apertures in the frame may be provided, besides with the indicating lines, with special marks, by which certain notes are made prominent according to their importance for the key to be examined.

In addition to the sliding member referred to the device may be provided with an independent auxiliary sliding member, the indicating lines of which form the notes or note values into subsidiary groups.

By the use of such a device the music pupil is enabled to determine mechanically the simplest and most difficult harmonic relations of all kinds in music and to have them presented to him in proper sequence, so that he can see them at a glance. It is also possible by means of the new device to read off directly each separate note in any given musical composition in its correct musical relation and thus to analyze rapidly and correctly harmonically complicated passages in modern compositions. The device also renders it possible to read off directly the number of vibrations of every musical note of pure pitch and thereby to determine quickly the exact interval between two or more notes. Finally, it is possible without any knowledge of the laws of harmony to transpose any musical piece purely mechanically into another key.

One constructional form of the device according to the present invention is shown in the accompanying drawing in which:—

Fig. 1 is a front view of the device,

Fig. 2 the back view,

Fig. 3 the device used with an auxiliary slide.

Figure 4:
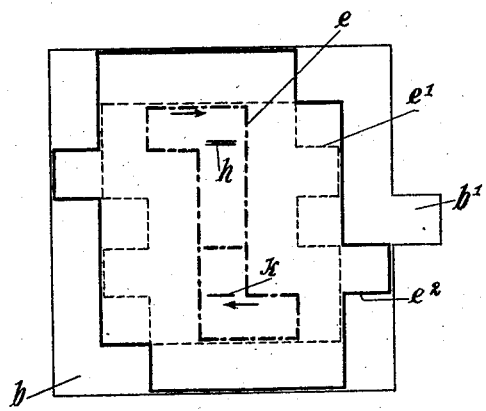
Fig. 4 is a detail hereinafter described.
Figure 5:
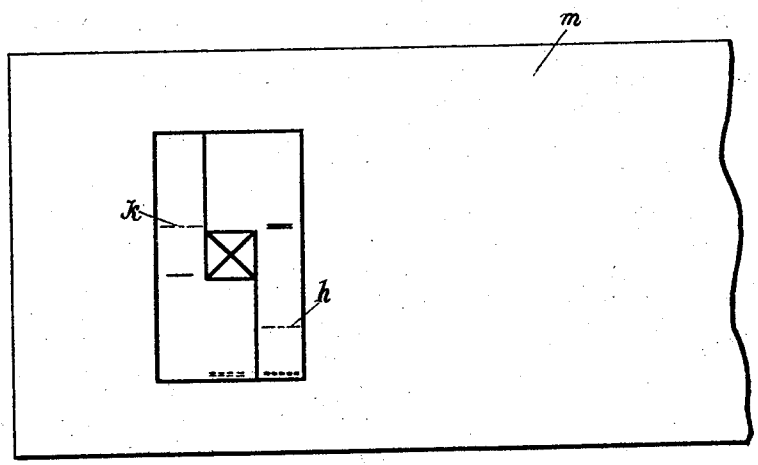
Fig. 5 is a view of the auxiliary slide detached.

The device or frame $a$ on its front side, Fig. 1, is provided with an aperture $b$ behind which is preferably arranged a transparent window. Within the device is arranged a sliding member $d$, capable of being slidden in guides in the frame $a$ behind the aperture $b$, and notes are set down thereon in vertical and horizontal rows in a certain order. On the window of the aperture $b$ lined frames $e$, $e^1$, $e^2$ are provided, which each enclose or embrace certain of the rows of notes marked on the slide $d$ and form them into main groups. The aperture $b$ has a lateral extension $b^1$ in which may be exhibited the signature of the key to be examined. The various keys are marked on the slide, and this may be moved until the selected key is shown in the aperture extension $b^1$. In the constructional example shown the line $e$, dot and dash line, Fig. 4, embraces the range of the diatonic scale of the key-note and the line $e^1$, dotted line Fig. 4, the range of the chromatic tones of the tonic sphere and $e^2$, heavy black line Fig. 4, the range of the chromatic tones of the diatonic dominant sphere. Additional marks may be provided in the aperture for making certain notes prominent, thus for instance the mark $h$, Fig. 4, the tonic of the major key and the mark $k$ that of the minor key.

On the rear side $d$ of the sliding member (Fig. 2) the logarithmic vibration values of the notes marked on the front side are given at the places corresponding to the names of the notes and to show these, the back $a^1$ of the frame is provided with a similar observation aperture $f$, and a transparent window in which these values appear for the signature set to in the lateral aperture $f^1$. The transparent window of the aperture $f$ is also provided with a lined frame $g$, which form the note values into groups. The sliding member is adapted to be reversed, so that the front side of the same coacts with the rear aperture and vice versa.

It should be explained that the term logarithmic vibration values indicates logarithms on the base of 2 of the relative fractional number of vibrations or frequency ratio: For instance: The value of a "fifth" interval in fractions $=3/2=2^m$ ($m$=logarithmic vibration value) log $3/2=m.$ log. 2 therefore $$m = \frac{\log. 3 - \log. 2}{\log. 2} = 0.585$$

that is 585 thousandths of the octave.

The device is provided with an additional auxiliary sliding member $m$, which is capable of being moved independently of the main sliding member. On this auxiliary sliding member a lined frame $m^1$ is provided, which depending upon the position of the main sliding member $d$ indicate musical subsidiary groups, for instance the triad (reading across) and the diatonic scale of the dominant of the major key and so on up to the most difficult chromatic relations in the chromatic dominant sphere (double chromatics).

The auxiliary sliding member $m$ is adapted to be slid both vertically and horizontally. It is transparent and is moved between the main sliding member and the rear aperture $f$. For using this auxiliary sliding member the window of the rear aperture is provided with numbered squares 1 to 14, Fig. 3, which, coacting with the lines of the auxiliary sliding member $m$, determine all the musical subsidiary groups of the respective key.

Players of all stringed instruments are enabled to read off directly on the device for all keys, whether the notes, which are printed as notes on the open strings, and which notes of this kind should not be played in this manner, but as stopped notes on another string, as according to the reading on the device they differ in pure pitch in the particular key from the open string, which is tuned in a pure fifth to the A of concert pitch, by a number of vibrations.

*Example.*

In B♭ flat major, the violinist must not play an E (=E flat ♯ i. e. E♭ made natural on the open E^ string, as the pure fifth E^ to the A^ of German concert pitch (Kammerton) is too high by a syntonic comma in comparison to the only E able to be used in B flat^ major and therefore sounds out of tune, compare with indicator with the slide $d$ adjusted to the key of B♭. The syntonic comma is equal to the relative value of vibration=81:80. In the present case this would equal 0.018.

The singer recognizes for each key the difference of pure pitch between the intervals in the major and minor of the same scale (for instance C major and C minor), he will for instance recognize that he must not sing the second degree in the major and minor the same, as has been assumed hitherto, but that the second degree in the minor differs from the second degree in the major of the same key by a whole syntonic comma, hence very distinctly in the case of singing. The new device will also be of great assistance in the correct singing of chromatic notes, as with the aid of the device the singer for the first time has presented to him all harmonically correct and possible notes of pure pitch for each separate key in a clearly arranged manner.

The new device enables the composer to ascertain in chromatically complicated modern music for orchestra or in chamber music with the piano, which chromatic notes he must if possible avoid giving to the instruments of fixed intonation (piano, organ, wood-wind) and give to those of variable intonation (the strings). By this means he avoids the ever recurring mistake in modern music, that harmonic relations, which are really correct but are only complicated, are either not understood at all or are felt to be incorrect or discordant, owing to their being reproduced in a very faulty manner.

The free spaces on the frame may be filled with directions for use, tables and the like.

Having now particularly described and ascertained the nature of my said invention and in what manner the same is to be performed, I declare that what I claim is:—

1. A device for determining the harmonic relations of musical notes, comprising in combination a frame member, a sliding member capable of sliding in the frame member, observation apertures in the frame member, rows of notes marked on the said sliding member and a system of lines in the said apertures, whereby notes marked on the sliding member and brought by the position of the sliding member into a certain relation to a key are formed into musical groups, as set forth.

2. A device for determining the harmonic relations of musical notes, comprising in combination a frame member, a sliding member capable of sliding in the frame member, observation apertures in the frame member, rows of notes marked on the said sliding member, a system of lines in the said apertures, whereby notes marked on the sliding member and brought by the position of the sliding member into a certain relation to a key are formed into musical groups and marks on the said apertures, whereby certain notes are made prominent, as set forth.

3. A device for determining the harmonic relations of musical notes, comprising in combination a frame member, a reversible sliding member capable of sliding in the frame member, observation apertures in the frame member, rows of notes marked on the said sliding member, a system of lines in the said apertures, whereby notes marked on the sliding member and brought by the position of the sliding member into a certain relation to a key are formed into musical groups and marks on the said apertures, whereby certain notes are made prominent, as set forth.

4. A device for determining the harmonic relations of musical notes, comprising in combination a frame member, a reversible sliding member capable of sliding in the frame member, observation apertures in the frame member, rows of notes marked on the said sliding member, a system of lines in the said apertures, whereby notes marked on the sliding member and brought by the position of the sliding member into a certain relation to a key are formed into musical groups, marks on the said apertures, whereby certain notes are made prominent, an auxiliary sliding member and lines and marks on the auxiliary sliding member capable of coacting correspondingly with marks of one of the apertures, whereby the notes and note values are formed into subsidiary groups, as set forth.

In testimony whereof I have signed my name to this specification.

HANS SCHÜMANN.